United States Patent Office 3,256,329
Patented June 14, 1966

3,256,329
PROCESS FOR PREPARING BRIDGEHEAD-SUBSTITUTED BICYCLO[2.2.2]OCTANE AND TRICYCLO[3.3.1.1³,⁷]DECANE AMINES AND DIAMINES
James C. Kauer, Wilmington, Del., assignor to E. I. du Pont de Nemours and Company, Wilmington, Del., a corporation of Delaware
No Drawing. Filed June 9, 1964, Ser. No. 373,825
13 Claims. (Cl. 260—563)

This application is a continuation-in-part of my application Serial No. 147,728 filed October 26, 1961.

This invention relates to a new method for preparing bicyclo[2.2.2]octane-1-amines and tricyclo[3.3.1.1$^{3,7}$]-decane-1-amines as well as the corresponding bicyclo[2.2.2]octane-1,4-diamines and tricyclo[3.3.1.1$^{3,7}$]decane-1,3-diamines.

A new and advantageous method has now been discovered for preparing bridgehead-substituted amines and diamines which consists in subjecting to aminolysis a compound of the group (1) 1- and 1,4-substituted bicyclo[2.2.2]octanes

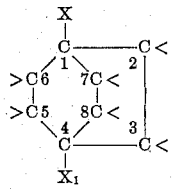

and (2) 1- and 1,3-substituted tricyclo[3.3.1.1$^{3,7}$]decanes

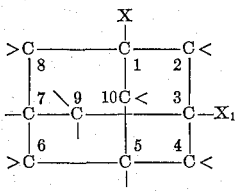

To prepare monoamines, the substituent on the 1-position, i.e., X, is a "leaving group" selected from the group consisting of halogen, sulfate, phosphate, perchlorate, nitrate, alkanesulfonyloxy and arenesulfonyloxy and the free valences on other nuclear carbons are satisfied by hydrogen or monovalent hydrocarbon radicals. Where it is desired to produce bridgehead-substituted diamines, the substituent $X_1$, on the 4-carbon of the octane or the 3-carbon of the decane is also a leaving group. The preferred compounds are those in which the leaving group is chlorine, bromine, iodine, methanesulfonyloxy, benzenesulfonyloxy or p-toluenesulfonyloxy and any additional substituents are alkyl groups of up to 19 carbon atoms, particularly of up to 7 carbons, cycloalkyl groups of up to 8 carbons, and aryl groups of up to 14 carbons, particularly of up to 10 carbons.

The expression "leaving groups" is used herein in the sense defined on page 261 in Gould's "Mechanism and Structure in Organic Chemistry" and includes such groups as chlorine, bromine, iodine, p-bromobenzenesulfonyloxy, p-toluenesulfonyloxy(tosyloxy), methanesulfonyloxy, butanesulfonyloxy, benzenesulfonyloxy, nitrate, perchlorate, phosphate, sulfate, and the like.

The new process of this invention consists in subjecting to aminolysis in a reactor a polycyclic compound of the aforementioned kind containing "leaving groups" in the 1, 1,3- or 1,4-positions, desirably in the presence of a reaction medium which is essentially free of hydroxyl groups.

In the context of this specification, aminolysis is defined as reaction with ammonia or a primary or secondary amine. Thus, the aminating agents include ammonia, primary amines and secondary amines, the hydrocarbon portions of which amines contain at most one intrachain oxygen atom or one amino nitrogen atom per hydrocarbyl group, and preferably at most one such oxygen or nitrogen atom per molecule, and otherwise contain only carbon and hydrogen. A preferred group comprises ammonia and aliphatic primary and secondary amines, including cycloaliphatic amines and heterocyclic amines in which the amino nitrogen is part of the heterocyclic ring, which amines may contain intrachain oxygen or amino nitrogen within the limits set forth above.

Especially preferred, because of the absence of side reactions, are compounds of the formula

where R and R' are the same or different and are hydrogen, alkyl, alkoxyalkyl, aminoalkyl, alkylaminoalkyl, dialkylaminoalkyl, or cycloalkyl, and where R and R' may be joined together to form an akylene radical (i.e., a divalent, saturated aliphatic hydrocarbon radical) which with the nitrogen of the above formula forms a heterocylic ring and which alkylene radical may be interrupted by at most one intrachain oxygen or nitrogen atom.

Most preferred are compounds of the above formula in which R and R' may be the same or different and are hydrogen, lower alkyl or cycloalkyl, at most one of them being cycloalkyl and in which R and R', when joined together, can be a lower alkylene group, particularly those compounds in which the total carbon content of R and R' is at most eight carbons.

Illustrative amines that are suitable include ethylamine, tert-butylamine, isopentylamine, hexylamine, cycloheptylamine, octylamine, octadecylamine, cyclohexyl(methyl)-amine, diisopropylamine, pyrrolidine, piperidine, 3,3-diethylpyrrolidine, 3-methoxypropylamine, 2-diethylaminoethylamine, morpholine, piperazine, 2-aminoethylamine, and 6-methylaminohexylamine.

Theoretically the aminolysis reaction requires 2 moles of ammonia, primary or secondary amine per mole of 1,4-disubstituted bicyclo[2.2.2]octane or 1,3-disubstituted tricyclo[3.3.1.1$^{3,7}$]decane and 1 mole of aminolysis reagent per mole of 1-substituted bicyclo[2.2.2]octane or tricyclo[3.3.1.1$^{3,7}$]decane. In practice, at least 2 moles of ammonia, primary or secondary amine is used per equivalent of leaving group in the indicated positions of the substituted polycyclic materials.

The process can be carried out at atmospheric, subatmospheric, or superatmospheric pressures. For convenience, it is usually carried out in a closed reactor. Since the rate of reaction is increased by increasing the pressure, it is advantageous, especially with the most preferred aminating agents, to charge the reactor with an amount of aminating agent such that at reaction temperature the total internal pressure is within the range of 5 to 3000 atmospheres. The course of the reaction can be followed by noting the drop in pressure as the aminating agent is consumed. It is not essential to follow the pressure change in this manner, however. Completion of the reaction can be determined simply by examining a portion of the reaction mixture. Generally, the process requires from 15 minutes to 30 hours, depending on the aminating agent, the substituted polycyclic starting material, and the particular reaction conditions.

The temperature employed for the reaction is between 80 and 325° C. However, since best results from the standpoint of product yield and reaction rate are obtained within the more restricted range of 100 to 300° C., the aminolysis is usually conducted within this range.

The aminolysis can be conducted in the absence of an added reaction medium. It is usually desirable to operate under anhydrous conditions in the presence of a normally liquid medium which is unreactive with the reactants and reaction products. Such media are preferably nonhydroxylic compounds. Excess aminating agent is a good medium. Examples of other suitable media are heptane, cyclohexane, tetrahydronaphthalene, diethyl ether, tetrahydrofuran, and the like.

The amount of reaction medium employed is not critical and it can equal or exceed the weight of the reactants by many fold.

In a convenient way for carrying out the aminolysis a pressure reactor which has been purged of oxygen by sweeping with nitrogen and evacuating is charged with the 1-, or 1,4-substituted bicyclo[2.2.2]octane or 1- or 1,3-disubstituted tricyclo[3.3.1.1$^{3,7}$]decane. The charged reactor is thereafter placed in a rocker mechanism and charged with aminating agent so that at 80 to 325° C. the pressure within the reactor is within 5 and 3000 atmospheres. After reaction is complete, which usually requires from 15 minutes to 30 hours, depending upon the particular substituent or substituents which are present on the bicyclo[2.2.2]octane or tricyclo[3.3.1.1$^{3,7}$]decane, the reaction mixture is permitted to cool, excess aminating agent is bled off, the reactor is opened and discharged. The desired bicyclo[2.2.2]octane - 1 - amine, tricyclo [3.3.1.1$^{3,7}$]decane-1-amine, the corresponding bicyclo [2.2.2]octane - 1,4 - diamine or tricyclo[3.3.1.1$^{3,7}$]decane-1,4-diamine is conveniently isolated from the reaction mixture by extraction from the reaction mixture, desirably with diethyl ether, and evaporation of the ether extract. Other methods, however, such as purification of the amino compound in the form of its hydrochloride can be used if desired.

The examples which follow are submitted to illustrate and not to limit this invention.

EXAMPLE I

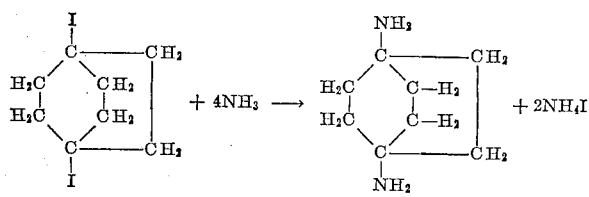

A mixture of 10 g. of 1,4-diiodobicyclo[2.2.2]octane and 30 ml. of cyclohexane was heated to 260° C. for 15 hours in a 400 ml. stainless steel autoclave under an anhydrous amonnia pressure of 1000 atmospheres. The product was filtered, and the gray solid residue (9.6 g.) was treated with 5 g. of sodium hydroxide and 50 ml. of ice. The resulting solution was continuously extracted with ether for 24 hours. The ether was evaporated to dryness to yield 0.40 g. of crude yellowish crystalline 1,4-diaminobicyclo[2.2.2]octane, which was identified by comparison of its spectrum with that of an authentic sample prepared by the Curtius degradation of bicyclo[2.2.2] octane-1,4-dicarboxylic acid. J. D. Roberts, W. T. Moreland, and W. Frazer, J. Am. Chem. Soc., 75, 637 (1953) showing the diethyl ester).

The 1,4-diiodobicyclo[2.2.2]octane used in the above example was prepared by heating a solution of 1,4-dihydroxybicyclo[2.2.2]octane with a large excess of hydriodic acid at 150° C. for 24 hours. Thereafter the reaction mixture was allowed to cool, filtered, the product washed with water, dried and purified by sublimation in vacuum.

Specific examples of compounds which can be employed in the process of Example I are:

1-chloro-4-bromobicyclo[2.2.2]octane
1-chloro-4-iodobicyclo[2.2.2]octane
1,4-dibromo-2-methyl-bicyclo[2.2.2]octane
1,4-diiodo-2-dodecyl-bicyclo[2.2.2]octane
1,4-bis(tosyloxy)-2-octadecyl-bicyclo[2.2.2]octane
1,4-bis(methanesulfonyloxy)-2,3-dimethyl-bicyclo [2.2.2]octane
1,4-bromo-2-cyclohexyl-bicyclo[2.2.2]octane
1,4-dibromo-2-phenyl-bicyclo[2.2.2]octane
1,4-diiodo-2-naphthyl-bicyclo[2.2.2]octane
1,3-dichloro-5-heptyl-tricyclo[3.3.1.1$^{3,7}$]decane
1,3-dibromo-5-octyl-tricyclo[3.3.1.1$^{3,7}$]decane
1,3-dibromo-5-methylcyclohexyl-tricyclo[3.3.1.1$^{3,7}$] decane
1,3-dibromo-tricyclo[3.3.1.1$^{3,7}$]decane
1,3-dichloro-5-methylphenyl-tricyclo[3.3.1.1$^{3,7}$]decane
1,3-diiodo-5-methylnaphthyl-tricyclo[3.3.1.1$^{3,7}$]decane and the like.

Substitution of the above 1,4- and 1,3-disubstituted derivatives for the 1,4-diiodo-bicyclo[2.2.2]octane of Example I in the process of Example I leads to the formation of 1,4-diamino-bicyclo[2.2.2]octane
1,4-diamino-bicyclo[2.2.2]octane
1,4-diamino-2-methyl-bicyclo[2.2.2]octane
1,4-diamino-2-dodecyl-bicyclo[2.2.2]octane
1,4-diamino-2-octadecyl-bicyclo[2.2.2]octane
1,4-diamino-2,3-dimethyl-bicyclo[2.2.2]octane
1,4-diamino-2-cyclohexyl-bicyclo[2.2.2]octane
1,4-diamino-2-phenyl-bicyclo[2.2.2]octane
1,4-diamino-2-naphthyl-bicyclo[2.2.2]octane
1,3-diamino-5-heptyl-tricyclo[3.3.1.1$^{3,7}$]decane
1,3-diamino-5-octyl-tricyclo[3.3.1.1$^{3,7}$]decane
1,3-diamino-5-methylcyclohexyl-tricyclo[3.3.1.1$^{3,7}$] decane
1,3-diamino-tricyclo[3.3.1.1$^{3,7}$]decane
1,3-diamino-5-methylphenyl-tricyclo[3.3.1.1$^{3,7}$]decane
1,3-diamino-5-methylnaphthyl-tricyclo[3.3.1.1$^{3,7}$]decane and the like.

EXAMPLE II

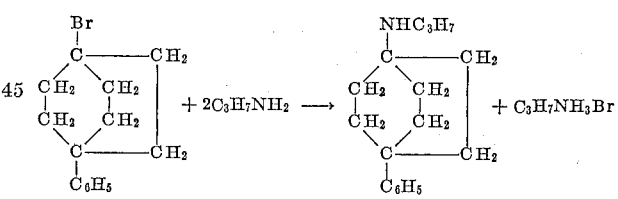

A mixture of 13.25 g. of 1-bromo-4-phenylbicyclo [2.2.2]octane and 17.7 g. of propylamine was heated with shaking in a sealed reactor ("Hastelloy" B, a commercial alloy containing nickel, molybdenum, iron cobalt, and chromium) at 300° C. for three hours and then cooled to room temperature. The product mixture was diluted with a solution of 25 ml. of aqueous 50% sodium hydroxide in 300 ml. of water and extracted with three 100-ml. portions of ethyl ether. The combined ether extracts were dried over solid potassium hydroxide and evaporated under reduced pressure. The residue was taken up in a solution of 20 ml. of concentrated hydrochloric acid in 500 ml. of water. The resulting mixture was extracted with two 100-ml. portions of ethyl ether to remove a small amount of an insoluble oil, and the extracts were discarded. The aqueous solution was concentrated to 150 ml. by boiling at atmospheric pressure and was allowed to cool. The crystalline solid that precipitated was separated by filtration and dried at 60° C./ca. 100 mm., to yield 3.63 g. of N-propyl-4-phenylbicyclo[2.2.2]octane-1-amine hydrochloride. One recrystallization from dilute hydrochloric acid and two recrystallizations from butyl alcohol gave a purified product melting at 207.5–210.0° C. The free amine can be prepared from the hydrochloride by making the latter alkaline with aqueous sodium hydroxide and isolating the product by conventional techniques.

*Anal.*—Calcd. for $C_{17}H_{26}NCl$: C, 72.96; H, 9.36; N, 5.01. Found: C, 72.75; H, 9.27; N, 4.85.

To prepare the 1-bromo-4-phenylbicyclo[2.2.2]octane used as starting material, 4-hydroxy-1-phenylbicyclo[2.2.2]octane-2-one (Colonge and Vuillemet, Bull. soc. chim. France, 1961, 2235) was reduced with hydrazine hydrate by the Wolff-Kishner method to give 1-hydroxy-4-phenylbicyclo[2.2.2]octane. Refluxing the latter compound in excess hydrobromic acid gave the 1-bromo compound.

EXAMPLE III

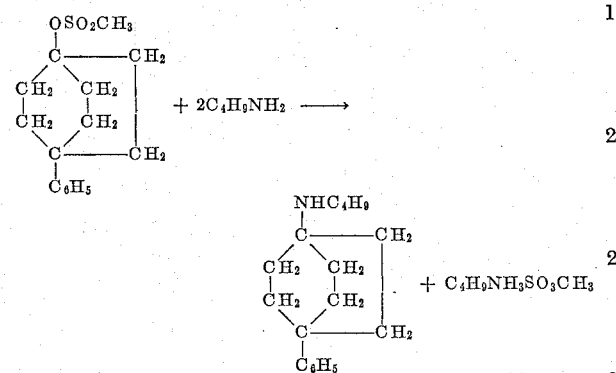

A mixture of 10.0 g. of 1-(methanesulfonyloxy)-4-phenylbicyclo[2.2.2]octane and 37 g. of butylamine was heated with shaking in a sealed reactor ("Hastelloy" B) at 200° C. for 6 hours and then cooled. Volatile material was removed from the product mixture at 60° C. under reduced pressure. The residual solid was suspended in a solution of 20 ml. of aqueous 50% sodium hydroxide in 50 ml. of water. The suspension was extracted with one 75-ml. portion and two 25-ml. portions of ethyl ether. The combined extracts were washed with 25 ml. of water, dried over solid potassium hydroxide, and concentrated under reduced pressure to an oil. The latter was taken up in a boiling solution of 10 ml. of concentrated hydrochloric acid in one liter of water. The boiling mixture was filtered to remove a small amount of insoluble oil and allowed to cool. The crystalline solid that precipitated was separated by filtration, washed with two 50-ml. portions of water, and dried at 60° C./ca. 100 mm., to give 4.55 g. of N-butyl-4-phenylbicyclo[2.2.2]octane-1-amine hydrochloride. After purification by two recrystallizations from butyl alcohol, the product melted at 245.5–246.5° C. The free amine can be prepared from the hydrochloride by making the latter alkaline with aqueous sodium hydroxide and isolating the product by conventional techniques.

*Anal.*—Calcd. for $C_{18}H_{28}NCl$: C, 73.57; H, 9.60; N, 4.77. Found: C, 73.85; H, 9.56; N, 4.82.

The starting material used in the foregoing example was prepared by reacting methanesulfonyl chloride with 1-hydroxy-4-phenylbicyclo[2.2.2]octane in pyridine, the temperature being kept below 30° C.

By replacement of the substituted bicyclo[2.2.2]octane and amine of Example III with those compounds indicated in Table I below the named polycyclic diamines can be produced.

EXAMPLE IV

By essentially the method of the preceding example, N-isopropyl-4-phenylbicyclo[2.2.2]octane-1-amine hydrochloride, M.P. 244–253° C. (dec.), was prepared from 1-(methanesulfonyloxy) - 4 - phenylbicyclo[2.2.2]octane and isopropylamine.

*Anal.*—Calcd. for $C_{17}H_{26}NCl$: C, 72.96; H, 9.36; N, 5.01. Found: C, 72.90; H, 9.28; N, 5.03.

EXAMPLE V

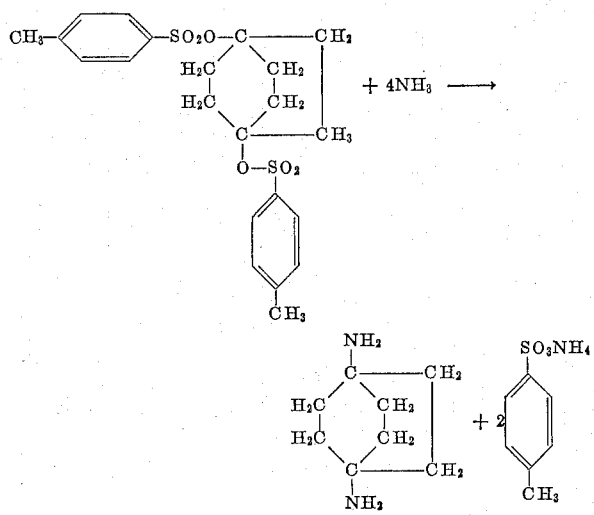

A mixture of 8.8 g. of 1,4-bis(tosyloxy)bicyclo[2.2.2]octane and 75 ml. of tetrahydrofuran was heated to 200° C. in a 400 ml. reactor under a pressure of 1000 atm. of anhydrous ammonia for 15 hours. The reaction mixture was filtered and washed with tetrahydrofuran.

The combined filtrates were evaporated under vacuum to yield 3.2 g. of grayish-white crystals. These crystals were vacuum sublimed (50° C./1 mm.) to yield 0.6 g. of 1,4-diaminobicyclo[2.2.2]octane, which was identified by comparison of its infrared spectrum with that of an authentic sample. The nonvolatile residue was chiefly unreacted tosylate.

1,4-bis(tosyloxy)bicyclo[2.2.2]octane was prepared by refluxing overnight a solution of excess p-toluenesulfonyl chloride in pyridine containing 1,4-dihydroxybicyclo[2.2.2]octane. The solution was poured on ice, and the crystalline product was filtered, dried, and recrystallized from hot xylene.

The 1,4-dihydrobicyclo[2.2.2]octane used in the above experiments was prepared as follows:

Part A

In each of ten experiments commercial perchlorocoumalin (150 g.) was slowly heated in a 400-ml. stainless steel reactor to 170° C., under a maximum pressure of ethylene of 1000 atmospheres. After 10 hours the product was cooled and distilled through a short column (B.P. 135°/5 mm.) to yield 1528 g. of solidified, substantially pure 1,2,3,4-tetrachlorobicyclo[2.2.2]oct-2-ene. A portion recrystallized from hexane produced white crystals melting at 95.5 to 96° C.

TABLE I

| Disubstituted Polycyclic Compound | Aminating Agent | Polycyclic Diamine Produced |
|---|---|---|
| 1,4-dibromo-2-ethylbicyclo[2.2.2]octane | 2-ethylhexylamine | N,N'-di(2-ethylhexyl)-2-ethylbicyclo[2.2.2]octane-1,4-diamine. |
| 1,4-diphosphatobicyclo[2.2.2]octane | Hexamethylenimine | 1,4-bishexamethyleniminobicyclo-[2.2.2]octane. |
| 1,3-diiodotricyclo[3.3.1.1³,⁷]decane | Decylamine | N,N'-didecyltricyclo[3.3.1.1³,⁷]decane-1,3-diamine. |
| 1,3-di(butanesulfonyloxy)tricyclo[3.3.1.1³,⁷]decane | Diisobutylamine | N,N'-diisobutyltricyclo[3.3.1.1³,⁷]decane-1,3-diamine. |
| 1,3-dibromo-5-phenyltricyclo-[3.3.1.1³,⁷]decane | Piperidine | 1,3-dipiperidino-5-phenyltricyclo-[3.3.1.1³,⁷]decane. |
| 1,3-dinitratotricyclo[3.3.1.1³,⁷]decane | Isohexylamine | N,N'-diisohexyltricyclo[3.3.1.1³,⁷]decane-1,3-diamine. |

*Anal.*—Calcd. for $C_8H_8Cl_4$: C, 39.1; 7, 3.3; Cl, 57.7. Found: C, 39.3; H, 3.8; Cl, 57.4.

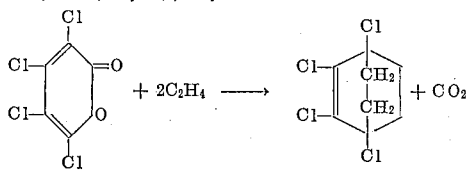

Part B

In each of five experiments one fifth of a solution of 1230 g. of the 1,2,3,4-tetrachlorobicyclo[2.2.2]oct-2-ene, prepared as in Part A, above, in 11,840 g. of ethanol was treated with hydrogen in an 8-liter glass reactor at 40 lb./sq. in. using 4 g. of platinum oxide catalyst in each run. Crystalline 1,4-dichlorobicyclo[2.2.2]octane deposited directly from the combined solutions. The yield was 752 g. A portion recrystallized from hexane melted at 233.5° to 234.5° C.

*Anal.*—Calcd. for $C_8H_{12}Cl_2$: C, 53.6; H, 6.8; Cl, 39.6. Found: C, 53.9; H, 6.6; Cl, 39.4.

Part C

In each of eight experiments, 50 g. of 1,4-dichlorobicyclo[2.2.2]octane, prepared as in Part B above, 60 g. of cupric oxide, 24 g. of iron (wire or nails), and 200 ml. of water was sealed in a 400-ml. stainless steel reactor provided with means for vigorously agitating the contents. The charge was heated to 215° C. under autogenous pressure for 14 hours. After cooling to room temperature, the products from each of the runs were combined and filtered. The filtrate was extracted continuously with ether. The white crystalline material which crystallized from the ether solution was sublimed at 110° C. and 0.1 mm. pressure to yield 151 g. of 1,4-dihydroxybicyclo[2.2.2]octane. The solid from the filtration was dried and continuously extracted with ethanol to yield an additional 115 g. of 1,4-dihydroxybicyclo-[2.2.2]octane. The total yield was 266 g. (84%).

A portion twice recrystallized from xylene melted at 282–3° C. The proton magnetic resonance spectrum showed the equivalence of all the hydrogens bound to carbon. Infrared absorption spectral analysis in potassium bromide showed strong absorptions at 3210 and 1112 cm.$^{-1}$, typical of hydroxyl groups.

*Anal.*—Calcd. for $C_8H_{14}O_2$: C, 67.56; H, 9.93. Found: C, 67.81; H, 10.00.

EXAMPLE VI

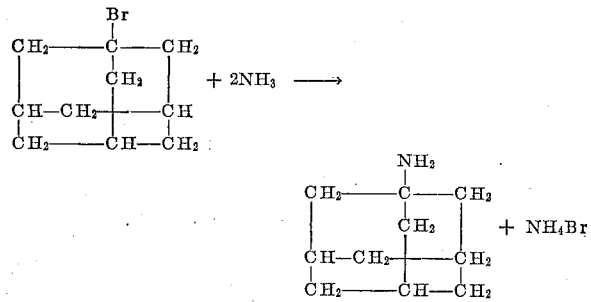

A mixture of 10 g. of 1-bromotricyclo[3.3.1.1$^{3,7}$]decane and 13 g. of anhydrous ammonia was heated with shaking in a sealed stainless-steel reactor at 200° C. for six hours, and cooled to room temperature. After the excess ammonia had been allowed to evaporate, the product mixture was dissolved in 200 ml. of 1 N hydrochloric acid, the solution was extracted with ether, and the extract was discarded. The solution was made alkaline by addition of 200 ml. of aqueous 50% sodium hydroxide, the mixture was extracted with ethyl ether, and the ether extract was dried over anhydrous potassium carbonate and evaporated, to give 4.1 g. of tricyclo[3.3.1.1$^{3,7}$]decane-1-amine. The product was identified by comparison of its infrared absorption spectrum with that of an authentic sample.

EXAMPLE VII

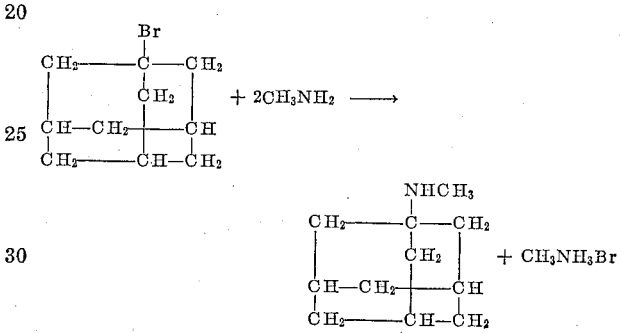

A mixture of 108 g. of 1-bromotricyclo[3.3.1.1$^{3,7}$]decane and 88 g. of methylamine was heated with shaking in a sealed stainless-steel reactor at 175° C. for six hours. The initial pressure of 579 lbs./in.$^2$ had dropped to an essentially constant pressure of 62 lbs./in.$^2$ after two hours and 15 minutes. The mixture was cooled to room temperature, excess methylamine was allowed to evaporate, and the product mixture was dissolved in 300 ml. of 2 N hydrochloric acid. Work-up by the method of the preceding example gave 41 g. of N-methyltricyclo [3.3.1.1$^{3,7}$]decane-1-amine. The product was identified by comparison of its infrared absorption spectrum with that of an authentic sample.

By essentially the method illustrated in the foregoing two examples other N-substituted tricyclo[3.3.1.1$^{3,7}$] decane-1-amines were prepared from 1-bromotricyclo [3.3.1.1$^{3,7}$]decane and the appropriate amines. About five moles of amine for each mole of bromo compound were usually employed. The reactants were heated in a sealed reactor equipped with a pressure gauge, the temperature being raised slowly until the pressure began to drop, at which point the temperature was held constant until no further decrease in pressure was observed. Reaction usually occurred at a temperature within the range 175–250° C. Tricyclo[3.3.1.1$^{3,7}$]decane-1-amines prepared by this procedure are listed in Table II.

TABLE II

| Starting Amine | Product | B.P. ° C./mm. | Analyses | C | H | N |
|---|---|---|---|---|---|---|
| Isopropylamine | N-isopropyltricyclo-[3.3.1.1$^{3,7}$] decane-1-amine | 130–132/16 | Calcd. for $C_{13}H_{23}N$ | 80.76 | 11.99 | 7.25 |
|  |  |  | Found | 81.30 | 12.77 | 7.62 |
|  |  |  |  | 81.31 | 12.17 |  |
| Isobutylamine | N-isobutyltricyclo-[3.3.1.1$^{3,7}$] decane-1-amine | 147–150/16 | Calcd. for $C_{14}H_{25}N$ | 81.09 | 12.15 | 6.76 |
|  |  |  | Found | 81.27 | 12.39 | 6.84 |
| Sec-butylamine | N-sec-butyltricyclo-[3.3.1.1$^{3,7}$] decane-1-amine | 138–140/14 | Calcd. for $C_{14}H_{25}N$ | 81.09 | 12.15 | 6.76 |
|  |  |  | Found | 81.31 | 11.95 | 6.99 |
| Cyclohexylamine | N-cyclohexyltricyclo-[3.3.1.1$^{3,7}$] decane-1-amine | 92–96/0.1 | Calcd. for $C_{16}H_{27}N$ | 82.34 | 11.66 | 6.00 |
|  |  |  | Found | 82.30 | 11.98 | 6.16 |
| Dipropylamine | N,N-dipropyltricyclo-[3.3.1.1$^{3,7}$] decane-1-amine | 100–102/0.65 | Calcd. for $C_{16}H_{29}N$ | 81.63 | 12.42 | 5.95 |
|  |  |  | Found | 82.00 | 12.31 | 6.23 |

TABLE III

| Substituted Polycyclic Compound | Aminating Agent | Polycyclic Amine Produced |
| --- | --- | --- |
| 1-(p-bromobenzenesulfonyloxy)-bicyclo[2.2.2]octane | Ammonia | Bicyclo[2.2.2]octane-1-amine. |
| 1-iodo-4-methylbicyclo[2.2.2]-octane | 3,6-dimethylhexamethylenimine | 1-(3,6-dimethylhexamethylenimino)-4-methylbicyclo[2.2.2]octane. |
| 1-chorobicyclo[2.2.2]octane | Dodecylamine | N-dodecylbicyclo[2.2.2]octane-1-amine. |
| 1-bromobicyclo[2.2.2]octane | Heptylamine | N-heptylbicyclo[2.2.2]octane-1-amine. |
| 1-bromobicyclo[2.2.2]octane | Ammonia | Bicyclo[2.2.2]octane-1-amine. |
| 1-bromo-4-ethylbicyclo[2.2.2]octane | do | 4-ethylbicyclo[2.2.2]octane-1-amine. |
| 1-chloro-4-phenylbicyclo[2.2.2]octane | do | 4-phenylbicyclo[2.2.2]octane-1-amine. |
| 1-bromo-3,5-7-trimethyltricyclo-[3.3.1.1³,⁷]decane | do | 3,5,7-trimethyltricyclo[3.3.1.1³,⁷]decane-1-amine. |
| 1-benzenesulfonyloxytricyclo-[3.3.1.1³,⁷]decane | Dimethylamine | N,N-dimethyltricyclo[3.3.1.1³,⁷]decane-1-amine. |
| 1-chloro-3-cyclohexyltricyclo-[3.3.1.1³,⁷]decane | 5-ethyl-2-methyl-piperidine | 1-(5-ethyl-2-methylpiperidino)-3-cyclohexyltricyclo[3.3.1.1³,⁷]decane. |
| 1-iodotricyclo[3.3.1.1³,⁷]decane | Heptadecylmethylamine | N-heptadecyl-N-methyltricyclo-[3.3.1.1³,⁷]decane-1-amine. |
| 1-iodotricyclo[3.3.1.1³,⁷]decane | Ammonia | Tricyclo[3.3.1.1³,⁷]decane-1-amine. |
| 1-perchloratotricyclo-[3.3.1.1³,⁷]decane | Methylamine | N-methyltricyclo[3.3.1.1³,⁷]decane-1-amine. |
| 1-bromo-3,5-diisopropyltricyclo[3.3.1.1³,⁷]decane | (Methylcyclopentyl)amine | N-methylcyclopentyl-3,5-diisopropyltricyclo[3.3.1.1³,⁷]decane-1-amine. |
| 1-sulfatotricyclo[3.3.1.1³,⁷]decane | 2-methylbutyl-amine | N-(2-methylbutyl)tricyclo-[3.3.1.1³,⁷]decane-1-amine. |
| 3-ethyl-1-iodotricyclo-[3.3.1.1³,⁷]decane | Butylethylamine | N-butyl-N-ethyltricyclo-[3.3.1.1³,⁷]decane-1-amine. |

Table III above lists other bicyclo[2.2.2]octane-1-amines and tricyclo[3.3.1.1³,⁷]decane-1-amines that can be prepared by the process exemplified in the foregoing examples or by routine variations thereof, together with the starting materials that are used for each product.

The alkyl-substituted 1,4-dihalobicyclo[2.2.2]octanes can be made by various methods. A particularly useful method is that which starts with 1,2,3,4-tetrachlorocyclohexa-1,3-diene, which is accessible from perchlorocoumalin and ethylene. Reaction of the diene with the appropriate alkene will produce the corresponding 1,2,3,4-tetrachloro-5-alkyl-cyclo[2.2.2]oct-2-ene. Hydrogenation of this octene produces the 1,4-dichloro-2-alkyl-bicyclo[2.2.2]octane.

Hydrolysis of the 1,4-dichloro-2-alkyl-bicyclo[2.2.2]octane with water in the presence of a copper oxide-iron metal catalyst at about 200° C. produces the corresponding glycol, 1,4 - dihydroxy - 2-alkyl-bicyclo[2.2.2]octane. Esterification of the hydroxyl groups produces the esters and reaction with a hydrohalic acid forms the corresponding halide.

1,3-dibromo - tricyclo[3.3.1.1³,⁷]decane and 1,3-dihydroxy-tricyclo[3.3.1.1³,⁷]decane are known compounds (Ber. 94, 1366 (1960)).

1-hydroxybicyclo[2.2.2]octane-3-ones substituted with alkyl or aryl groups in the 4-position can be made by the method of Colonge and Vuillement, Bull. Soc. Chim. France, 1961, 2235. The oxo groups in these compounds can be reduced with hydrazine hydrate by the Wolff-Kishner procedure to give the corresponding 1-hydroxybicyclo[2.2.2]octanes substituted in the 4-position.

1-chloro-, 1-bromo-, 1-iodo-, and 1-hydroxytricyclo[3.3.1.1³,⁷]decanes are described by Stetter, Angew, Chem. (Int. Ed.) 1, 286 (1962). The same reference describes tricyclo[3.3.1.1³,⁷]decanes substituted with alkyl, cycloalkyl, and aryl groups in the 1-position. It also describes 2-alkyl and 1,3-dialkyl derivatives of tricyclo[3.3.1.1³,⁷]decanes. Halogen can be introduced into bridgehead positions of these hydrocarbons by direct halogenation. For example, reaction of 1-methyltricyclo[3.3.1.1³,⁷]decane with bromine gives 1-bromo-3-methyltricyclo[3.3.1.1³,⁷]decane. Further bromination gives the 1,3-dibromo-5-methyl compound.

1,3,5-trimethyltricyclo[3.3.1.1³,⁷]decane and its bromination to give 1 - bromo - 3,5,7 - trimethyltricyclo[3.3.1.1³,⁷]decane are described by Koch and Franken, Chem. Ber. 96, 213 (1963).

1 - bromobicyclo[2.2.2]octane and 1 - hydroxybicyclo[2.2.2]octane are described by Grob et al, Helv. Chim. Acta, 41, 1191 (1958). 1-chloro-bicyclo[2.2.2]octane is described in a thesis by Sayigh, Columbia University, 1952 (University Microfilms No. 9532).

The 5 - aryl derivatives of the 1,3 - dihalotricyclo[3.3.1.1³,⁷]decanes can be made from the 1,3,5-tribromotricyclo[3.3.1.1³,⁷]decanes by the Friedel-Crafts reaction, employing the appropriate aromatic compound and aluminum bromide catalyst.

This invention provides a simple, one-step method for preparing polycyclic bridgehead amines and diamines from readily accessible intermediates. It should be understood that in the examples showing preparation of an amine hydrochloride, the polycyclic amine was first produced and then purified in a procedure that resulted in the production of the hydrochloride. All the polycyclic amines and diamines produced by the process of this invention are useful as corrosion inhibitors. In addition, the diprimary and disecondary diamines are particularly useful for preparing polyamides which show excellent light stability. The ditertiary amines are useful for preparing polymeric quaternary ammonium salts. Some of the primary, secondary and tertiary monoamines have antiviral activity as disclosed in my copending application Serial No. 277,141 filed May 1, 1963, and now abandoned, and in copending application Serial No. 318,073 filed October 22, 1963.

What is claimed is:

1. The process for preparing bridgehead-substituted amines and diamines comprising heating a member of the group consisting of 1- and 1,4-substituted bicyclo[2.2.2]octanes and 1- and 1,3-substituted tricyclo[3.3.1.1³,⁷]decanes wherein the substituents on the 1- and 1,4-positions of the octanes and on the 1- and 1,3-positions of the decanes respectively are groups selected from the class consisting of chlorine, bromine, iodine, monocyclicarenesulfonyloxy, alkanesulfonyloxy, nitrate, sulfate, phosphate and perchlorate, with a member of the group consisting of ammonia, primary and secondary amines of the formula

wherein R and R', which may be the same, are selected from the group consisting of hydrogen, alkyl, alkoxyalkyl, aminoalkyl, alkylaminoalkyl, diakylaminoalkyl, and cycloalkyl and R and R' may be joined together as an akylene radical which with the nitrogen of the above formula forms a heterocyclic ring and which may be interrupted by at most one intrachain atom of the group of oxygen and nitrogen at a temperature in the range of 80° to 325° C.

2. The process of claim 1 wherein the reaction temperature lies between 100° and 300° C.

3. The process of claim 1 wherein the reaction is conducted in the presence of an inert organic liquid medium.

4. The process for preparing 1,4-diaminobicyclo[2.2.2]octanes, which comprises heating a bicyclo[2.2.2]octane that is substituted on each of the 1- and 4-positions with a member of the group consisting of chlorine, bromine, iodine, monocyclicarenesulfonyloxy, alkanesulfonyloxy, nitrate, sulfate, phosphate and perchlorate, with a reactant of the group consisting of ammonia, primary and secondary amines of the formula

wherein R and R', which may be the same, are selected from the group consisting of hydrogen, alkyl, alkoxyalkyl, aminoalkyl, alkylaminoalkyl, dialkylaminoalkyl, and cycloalkyl and R and R' may be joined together as an alkylene radical which with the nitrogen of the above formula forms a heterocyclic ring and which may be interrupted by at most one intrachain atom of the group of oxygen and nitrogen at a temperature in the range of 80° to 325° C.

5. The process for preparing 1,4-diaminobicyclo[2.2.2]octane in accordance with claim 4 wherein the bicyclo compound that is subjected to the reaction is 1,4-diiodobicyclo[2.2.2]octane.

6. The process for preparing 1,4-diaminobicyclo[2.2.2]octane in accordance with claim 4 wherein the bicyclo compound that is subjected to the reaction is 1,4-bis(tosyloxy)bicyclo[2.2.2]octane.

7. The process for preparing a 1,3-diaminotricyclo[3.3.1.1$^{3,7}$]decane which comprises heating a tricyclo[3.3.1.1$^{3,7}$]decane that is substituted on each of the 1- and 3-positions with a member of the group consisting of chlorine, bromine, iodine, monocyclicarenesulfonyloxy, alkanesulfonyloxy, nitrate, sulfate, phosphate, and perchlorate with a reactant of the group consisting of ammonia, primary and secondary amines of the formula

wherein R and R', which may be the same, are selected from the group consisting of hydrogen, alkyl, alkoxyalkyl, aminoalkyl, alkylaminoalkyl, dialkylaminoalkyl, and cycloalkyl and R and R' may be joined together as an alkylene radical which with the nitrogen of the above formula forms a heterocyclic ring and which may be interrupted by at most one intrachain atom of the group of oxygen and nitrogen at a temperature in the range of 80° to 325° C.

8. The process for preparing bicyclo[2.2.2]octane-1-amines which comprises heating a bicyclo[2.2.2]octane that is substituted in the 1-position with a member of the group consisting of chlorine, bromine, iodine, monocyclicarenesulfonyloxy, alkanesulfonyloxy, nitrate, sulfate, phosphate, and perchlorate with a reactant of the group consisting of ammonia, primary and secondary amines of the formula

wherein R and R', which may be the same, are selected from the group consisting of hydrogen, alkyl, alkoxyalkyl, aminoalkyl, alkylaminoalkyl, dialkylaminoalkyl, and cycloalky and R and R' may be joined together as an akylene radical which with the nitrogen of the above formula forms a heterocyclic ring and which may be interrupted by at most one intrachain atom of the group of oxygen and nitrogen, at a temperature in the range of 80° to 325° C.

9. The process for preparing 1-amino-4-phenylbicyclo[2.2.2]octane in accordance with claim 8 wherein the bicyclo compound that is subjected to the reaction is 1-bromo-4-phenylbicyclo[2.2.2]octane.

10. The process for preparing tricyclo[3.3.1.1$^{3,7}$]decane-1-amines which comprises heating a tricyclo[3.3.1.1$^{3,7}$]decane that is substituted in the 1-position with a member of the group consisting of chlorine, bromine, iodine, monocyclicarenesulfonyloxy, alkanesulfonyloxy, nitrate, sulfate, phosphate, and perchlorate with a reactant of the group consisting of ammonia, primary and secondary amines of the formula

wherein R and R', which may be the same, are selected from the group consisting of hydrogen, alkyl, alkoxyalkyl, aminoalkyl, alkylaminoalkyl, dialkylaminoalkyl, and cycloalky and R and R' may be joined together as an alkylene radical which with the nitrogen of the above formula forms a heterocyclic ring and which may be interrupted by at most one intrachain atom of the group of oxygen and nitrogen at a temperature in the range of 80° to 325° C.

11. The process for preparing 1-aminotricyclo[3.3.1.1$^{3,7}$]decane in accordance with claim 10 wherein the tricyclo-compound that is subjected to the reaction is 1-bromotricyclo[3.3.1.1$^{3,7}$]decane.

12. The process for preparing 1,4-diaminobicyclo[2.2.2]octane which comprises heating 1,4-diiodobicyclo[2.2.2]octane with ammonia at a temperature in the range of 80° to 325° C.

13. The process for preparing 1-amino-4-phenylbicyclo[2.2.2]octane which comprises heating 1-bromo-4-phenylbicyclo[2.2.2]octane with propylamine at a temperature in the range of 80° to 325° C.

References Cited by the Examiner

UNITED STATES PATENTS

| | | | |
|---|---|---|---|
| 2,183,499 | 12/1939 | Clark et al. | 260—563 X |
| 2,261,002 | 10/1941 | Ritter | 260—563 X |
| 2,390,597 | 12/1945 | Law et al. | 260—563 X |
| 2,434,063 | 7/1947 | Shonle et al. | |
| 2,716,134 | 8/1955 | Reynolds et al. | 260—563 X |
| 2,972,631 | 2/1961 | Bain et al. | 260—563 |

FOREIGN PATENTS

| | | |
|---|---|---|
| 207,369 | 12/1955 | Australia. |
| 458,511 | 12/1936 | Great Britain. |

OTHER REFERENCES

Khorlin et al., C. A., vol. 53, p. 14025 (1959).
Kochetkov et al., C. A. vol. 52, p. 2765e (1958).
Wagner et al., "Synthetic Organic Chemistry," pp. 666–667 (1953).

CHARLES B. PARKER, *Primary Examiner.*